_(12)_ United States Patent
Gao

(10) Patent No.: US 8,082,094 B2
(45) Date of Patent: Dec. 20, 2011

(54) NAVIGATION APPARATUS CAPABLE OF CORRECTING POSITION DATA ACCORDING TO MAP MATCHING POSITION AND METHOD THEREOF

(75) Inventor: Jun-Tao Gao, Shanghai (CN)

(73) Assignee: Mitac Research (Shanghai) Ltd., Zha Bei District, Shanghai (CN)

( * ) Notice: Subject to any disclaimer, the term of this patent is extended or adjusted under 35 U.S.C. 154(b) by 852 days.

(21) Appl. No.: 12/214,607

(22) Filed: Jun. 20, 2008

(65) Prior Publication Data

US 2008/0319657 A1    Dec. 25, 2008

(30) Foreign Application Priority Data

Jun. 21, 2007  (TW) .............................. 96122387 A

(51) Int. Cl.
    *G01C 21/00*  (2006.01)
(52) U.S. Cl. ................ 701/205; 340/995.2; 340/995.22; 340/995.25
(58) Field of Classification Search .................. 701/16, 701/208, 211, 214–215, 217, 224, 200, 201, 701/205, 210; 342/357.32; 340/990, 995.1, 340/995.17, 995.18, 995.2, 995.22, 995.25, 340/995.28
See application file for complete search history.

(56) References Cited

U.S. PATENT DOCUMENTS

| 4,943,925 | A  | * | 7/1990  | Moroto et al. ................. 701/211 |
| 5,067,082 | A  | * | 11/1991 | Nimura et al. ................. 701/208 |
| 5,119,301 | A  | * | 6/1992  | Shimizu et al. ................ 701/217 |
| 5,390,124 | A  | * | 2/1995  | Kyrtsos ......................... 701/215 |
| 5,469,158 | A  | * | 11/1995 | Morita .......................... 340/988 |
| 6,081,230 | A  | * | 6/2000  | Hoshino et al. ........... 342/357.32 |
| 6,336,075 | B1 | * | 1/2002  | Park et al. ..................... 701/211 |
| 6,502,033 | B1 | * | 12/2002 | Phuyal ......................... 701/214 |
| 7,149,629 | B1 | * | 12/2006 | Scherzinger et al. ............. 702/5 |
| 2004/0030465 | A1 | * | 2/2004  | Conner et al. ................... 701/16 |
| 2004/0254727 | A1 | * | 12/2004 | Ockerse et al. ............... 701/224 |

* cited by examiner

*Primary Examiner* — Gerald J. O'Connor
*Assistant Examiner* — Natalie A Pass
(74) *Attorney, Agent, or Firm* — Hudak, Shunk & Farine Co. LPA

(57) ABSTRACT

This invention discloses a navigation apparatus correcting position data according to a map matching position and a method thereof. The navigation apparatus includes a satellite positioning module, an electronic map database, a map matching module and a correction module. The satellite positioning module provides a plurality of position data. The electronic map database stores at least one map data. The map matching module matches a position data with a map data to generate a map matching position corresponding to the position data. The correction module provides at least one turning point, and each turning point is situated at the map matching position to form an turning angular. If the turning angular exceeds a threshold value, the correction module calculates a position data and a map matching position statically collected within a predetermined time according to an algorithm to generate an offset to correct the position data behind the turning point.

14 Claims, 3 Drawing Sheets

NAVIGATION APPARATUS CAPABLE OF CORRECTING POSITION DATA ACCORDING TO MAP MATCHING POSITION AND METHOD THEREOF

FIELD OF THE INVENTION

The present invention relates to a navigation apparatus capable of correcting position data according to map matching position and its method, and more particularly to an apparatus and a method of generating an offset according to a map matching position to correct the position data generated by a global positioning system (GPS).

BACKGROUND OF THE INVENTION

As mobile communications and satellite navigations advance, a navigation apparatus such as a global positioning system (GPS) device, a mobile phone with a navigation function or a digital personal assistant with a navigation function becomes indispensable to of our daily life. During being transmitted from a satellite to the ground, the satellite positioning signal is easily affected due to factors and interferences such as various types of terrains, shelters, satellite time errors or signal delays, so the position data calculated by the global positioning system (GPS) often have errors, and thus an apparatus or a method is required to generate an offset for correcting the position data in order to provide a precise positioning on a navigation map.

In a prior art, a method of correcting the position data has been disclosed, and such method builds at least one differential global positioning system (DGPS) base station with a known reference position in advance. After receiving the satellite signals and calculating a position data according to the received satellite signals, the DGPS base station can obtain an offset by comparing the position data with latitude and longitude coordinates of the known reference position, and then transmit the offset to a navigation apparatus by a transmission module. The navigation apparatus includes a built-in differential global positioning system (DGPS) receiver for receiving the offset which can be used to correct the position data generated from the global positioning system (GPS), so that the precision of the map matching of the navigation apparatus can be improved.

However, the aforementioned prior art has the drawbacks of building at least one differential global positioning system (DGPS) base station, and the navigation apparatus also requires an additional differential global positioning system (DGPS) receiver. In other words, this method requires additional costs for hardware and software. Furthermore, if the navigation apparatus is at a location where no differential global positioning system (DGPS) base station is reachable or the navigation apparatus does not come with a differential global positioning system (DGPS) receiver, such method in prior art becomes useless.

To overcome the drawbacks of the prior art, and satisfy user requirements of the navigation apparatus, the inventor of the present invention according to years of experience in the related field to conduct extensive researches and experiments, and finally developed a navigation apparatus capable of correcting position data according to map matching position and its method in accordance with the present invention.

SUMMARY OF THE INVENTION

The objective of the present invention is to overcome the drawbacks of the prior art and satisfy user requirements by providing a navigation apparatus capable of correcting position data according to map matching position and its method, particularly an apparatus and a method of generating an offset according to map matching positions to correct the position data generated by a global positioning system (GPS). Compared with the prior art, the present invention does not require building a differential global positioning system (DGPS) base station or installing an additional DGPS receiver in the navigation apparatus, and the function like differential global positioning system (DGPS) also can be achieved.

To achieve the foregoing objective, the present invention provides a navigation apparatus capable of correcting position data according to the map matching position, comprising a satellite positioning module, an electronic map database, a map matching module and a correction module. The satellite positioning module is operable to provide a plurality of position data. The electronic map database stores at least one map data. The map matching module is used to match the position data with the map data for generating a plurality of map matching positions corresponding to the position data respectively. The correction module provides a turning point, situated between the map matching positions and calculates a turning angular at the turning point according to the map matching positions. If the turning angular exceeds a threshold value, the correction module generates an offset by calculating the position data and the map matching positions recorded within a predetermined time according to an algorithm, and the offset is used for correcting position data.

To achieve the foregoing objective, the present invention also provides a method of correcting position data according to map matching position, applied to a navigation apparatus which comprises a satellite positioning module, an electronic map database, a map matching module and correction module, and the method includes the steps of:

(a) Providing a plurality of position data by the satellite positioning module;

(b) Using the map matching module to match the position data with the map data stored in the electronic map database for generating a plurality of map matching positions corresponding to the position data respectively;

(c) Using the correction module to provide a turning point situated between the map matching positions, and calculating a turning angular at the turning point according to the map matching positions;

(d) generating an offset by calculating the position data and the map matching positions recorded within a predetermined time according to an algorithm, if the turning angular exceeds a threshold value;

(e) correcting the position data behind the recorded position data by the offset.

BRIEF DESCRIPTION OF THE DRAWINGS

The subject matter regarded as the invention is particularly pointed out and distinctly claimed in the concluding portion of the specification. The invention, both as to apparatus and method of operation, together with features and advantages thereof may best be understood by reference to the following detailed description with the accompanying drawings in which:

DETAILED DESCRIPTION OF THE INVENTION

The objectives, characteristics and advantages of the present invention will become apparent from the following detailed description taken with the accompanying drawing, and same numerals are used for representing the same elements respectively in the description and drawings of the invention.

Figure 1:
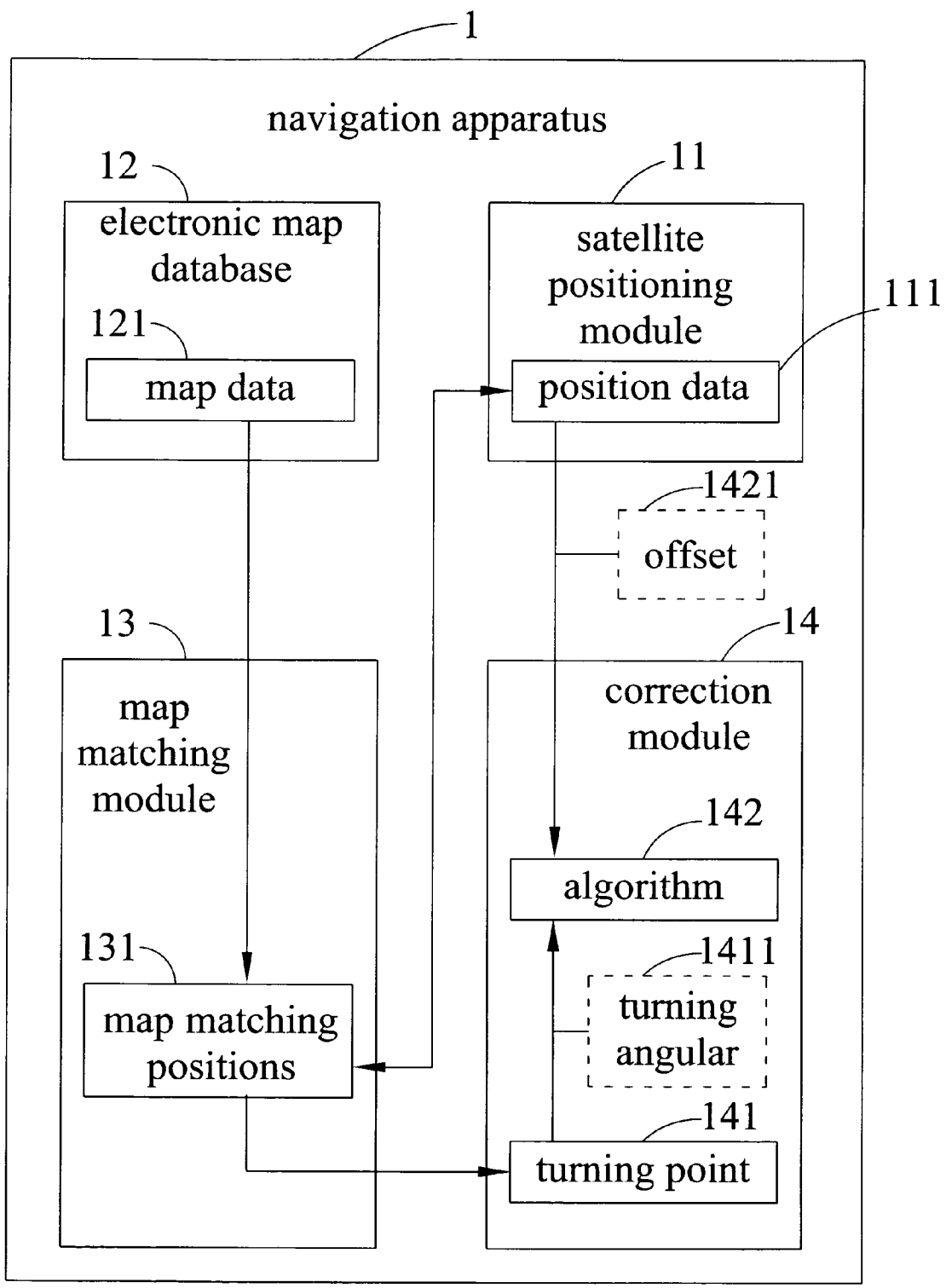
FIG. 1 is a schematic view of a navigation apparatus capable of correcting position data according to map matching position in accordance with the present invention.

Referring to FIG. 1 for a schematic view of a navigation apparatus capable of correcting position data according to map matching position in accordance with the present invention, a navigation apparatus 1 comprises a satellite positioning module 11, an electronic map database 12, a map matching module 13 and a correction module 14. Preferably, navigation apparatus 1 can be a global positioning system (GPS) device, a mobile phone with a navigation function or a digital personal assistant with a navigation function. The satellite positioning module 11, generally a global positioning system (GPS), is operable to provide a plurality of position data 111, and each position data 111 contains latitude and longitude coordinate. The electronic map database 12 stores at least one map data 121. The map matching module 13 is used to match the position data 111 with the map data 121 to generate a plurality of map matching positions 131 corresponding to the position data 111 respectively, and each map matching position 131 contains latitude and longitude coordinate.

Further, the correction module 14 provides a turning point 141 situated between the map matching positions 131 and calculates a turning angular 1411 at the turning point 141 according to the map matching positions 131. If the turning angular 1411 exceeds a threshold value, then the correction module 14 generates an offset 1421 by calculating the position data 111 and the map matching positions 131 recorded within a predetermined time according to an algorithm 142.

Preferably, the algorithm 142 can be the following formula:

$$\text{Delta}=((P(1)-p(1))+(P(2)-p(2))\ldots+(P(n)-p(n)))/n,$$

wherein Delta is an offset 1421, and P(1) ... P(n) are the position data 111, and p(1) ... p(n) are the map matching positions 131, and n is recorded number within a predetermined time. The offset 1421 can indicate the average error of the position data resulted from the satellite positioning signal, and the position data 111 behind the recorded position data can be corrected by the offset 1421 so as to improve precision of these position data 111. If position data 111 becomes more precise, the search range required by the map matching module 13 can be smaller, it can lead to better precision of map matching positions 131 and faster computational speed.

Figure 2:
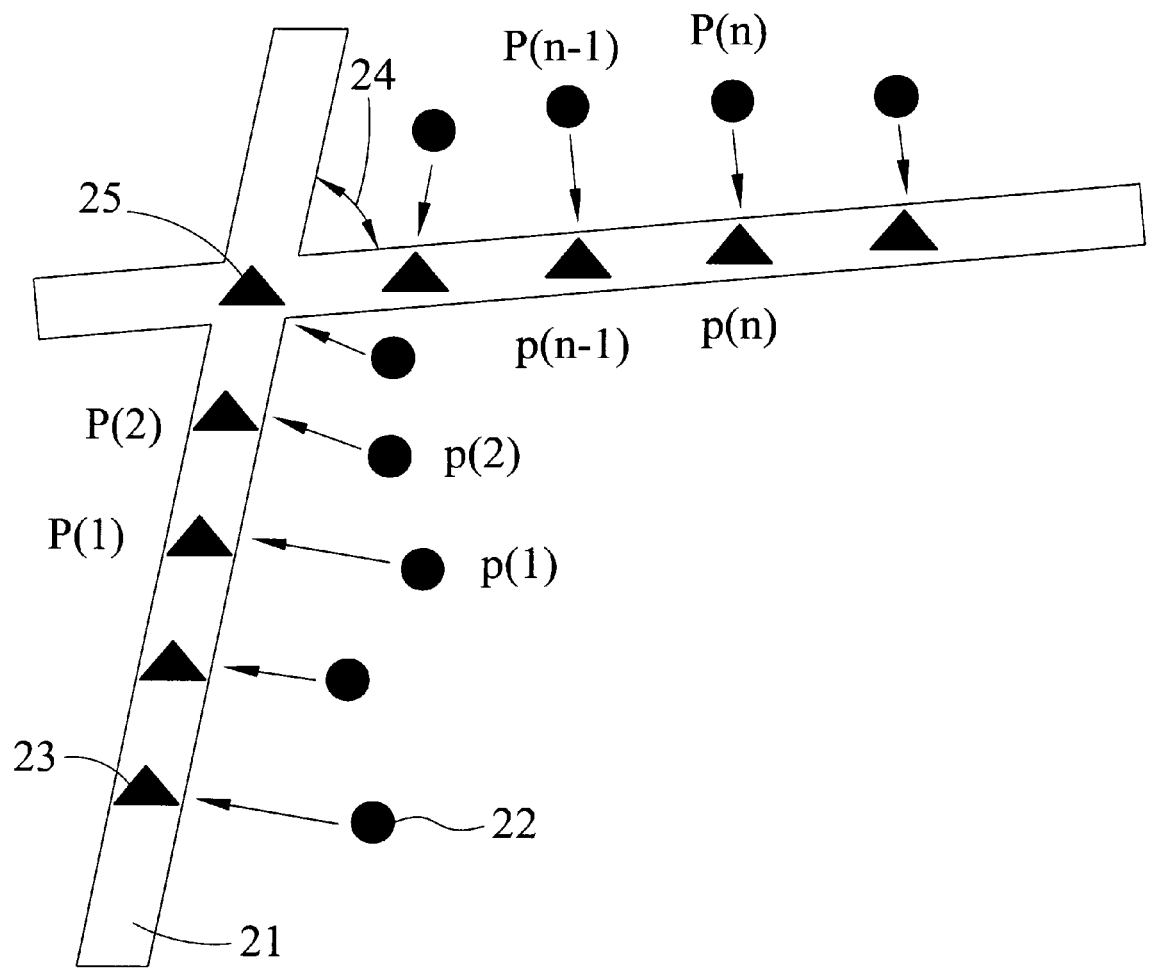
FIG. 2 is a schematic view of a method of correcting position data according to map matching position in accordance with the present invention.

Referring to FIG. 2 for a schematic view of a method of correcting position data according to map matching position in accordance with the present invention, the method is applied to a navigation apparatus such as a global positioning system (GPS) device, a mobile phone with a navigation function or a digital personal assistant with a navigation function. In FIG. 2, a satellite positioning module provides a plurality of position data 22 including P(1), P(2), ..., P(n−1), P(n). In the meantime, the position data 22 are matched with the map data 21 to generate a plurality of map matching positions 23 including p(1), p(2), ..., p(n−1), p(n) corresponding to the position data 22 respectively. Because of the error in satellite signal, a position shift exists between the calculated position data 22 and the map matching positions 23.

Further, a correction module provides at least one turning point 25, and each turning point 25 is situated on the map matching position 23 and calculates a turning angular 24 at the turning point 25 according to the map matching positions 23. If the turning angular 24 exceeds a threshold value, then the correction module calculates the position data 22 and the map matching positions 23 recorded within a predetermined time according to an algorithm to generate an offset which used for correcting the position data 22 behind the recorded position data 22, so as to improve precision of these position data 22. If position data 22 becomes more precise, the search range required by the map matching module can be smaller, it can lead to better precision of map matching positions 23 and faster computational speed.

It is noteworthy to point out that the algorithm can include the following formula:

$$\text{Delta}=((P(1)-p(1))+(P(2)-p(2))\ldots+(P(n)-p(n)))/n,$$

wherein Delta is an offset, and P(1 ... n) are the position data 22, and p(1 ... n) are the map matching positions 23, and n is recorded number within a predetermined time. The offset, each position data 22 and each map matching position 23 have a latitude coordinate and a longitude coordinate.

Figure 3:
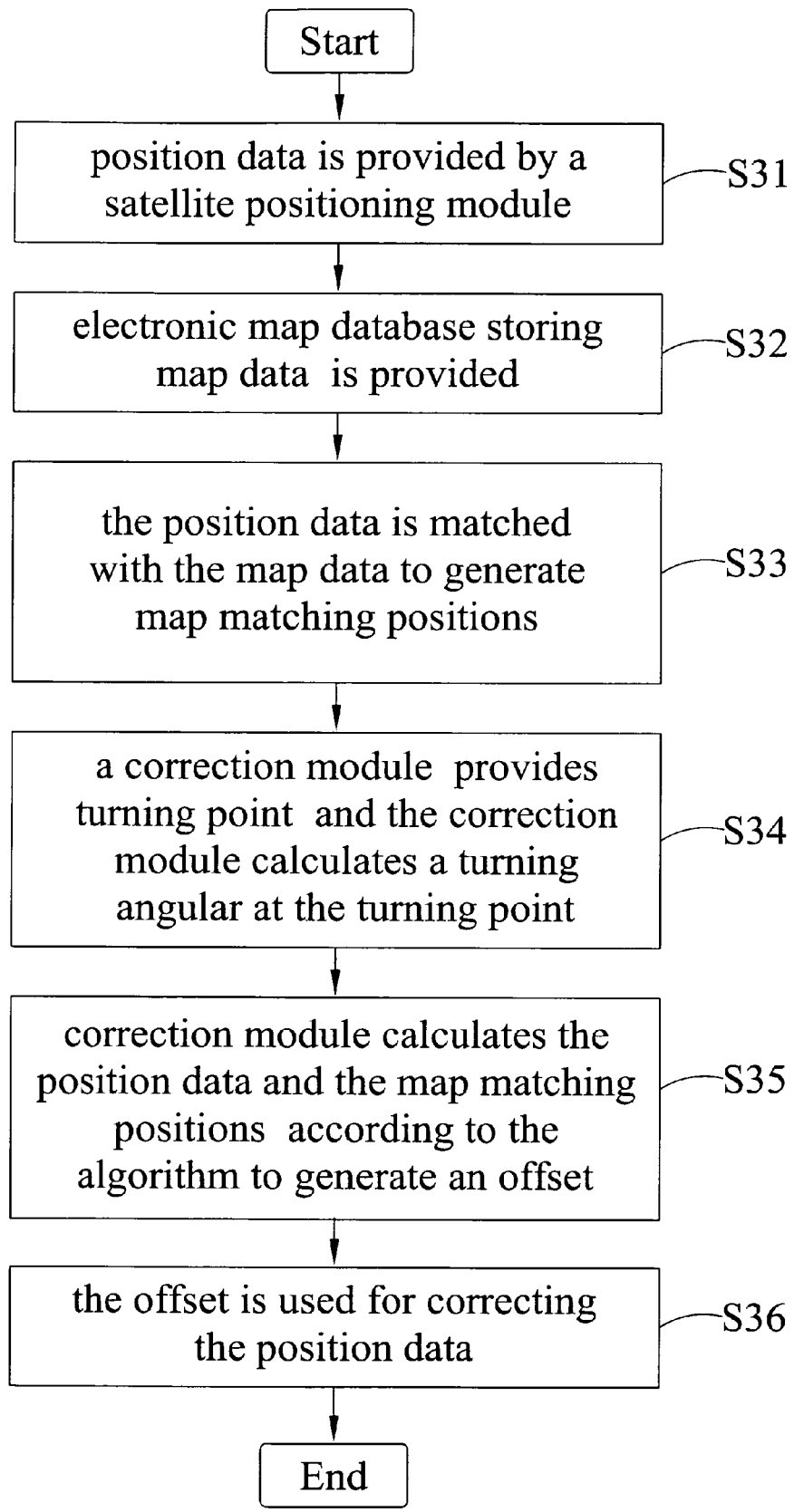
FIG. 3 is a flow chart of correcting position data according to map matching position of the present invention.

Referring to FIG. 3 for a flow chart of method of correcting position data according to a map matching position in accordance with the present invention, the method corresponds to the navigation apparatus 1 shown in FIG. 1. The navigation apparatus 1 can be a global positioning system (GPS) device, a mobile phone with a navigation function or a digital personal assistant with a navigation function. The method includes the following steps. In step S31 a plurality of position data 111 are provided by a satellite positioning module 11, such as a global positioning system (GPS). Preferably, each position data 111 includes latitude and longitude coordinate.

In step S32 an electronic map database 12 storing at least one map data 121 is provided. In step S33, the position data 111 is matched with the map data 121 by a map matching module 13 to generate a plurality of map matching positions 131 corresponding to the position data 111 respectively.

In step S34, a correction module 14 provides at least one turning point 141, and each turning point 141 is situated on the map matching position 131 and the correction module 14 calculates a turning angular 1411 at the turning point 141 according to the map matching positions 131.

If the turning angular 1411 exceeds than a threshold value, then the correction module 14 calculates the position data 111 and the map matching positions 131 recorded within a predetermined time according to the algorithm 142 to generate an offset 1421 in step S35. Preferably, the algorithm 142 can include the following formula:

$$\text{Delta}=((P(1)-p(1))+(P(2)-p(2))\ldots+(P(n)-p(n)))/n,$$

wherein Delta is an offset 1421, and P(1) ... P(n) are the position data 111, and p(1) ... p(n) are the map matching positions 131, and n is the recorded number within a predetermined time.

Finally, in step S36 the offset 1421 is used for correcting the position data behind the recorded position data. The offset 1421 can indicate the average error of the position data resulted from the satellite positioning signal, and the position data 111 behind the recorded position data can be corrected by the offset 1421 so as to improve precision of these position data 111. If position data 111 becomes more precise, the search range required by the map matching module 13 can be smaller, it can lead to better precision of map matching positions 131 and faster computational speed. The offset 1421, each of the position data 111 and each of the map matching positions 131 include latitude and longitude coordinate.

In summation of the above description, the present invention herein enhances the performance than the conventional structure and further complies with the patent application requirements and is thus duly filed for patent application. While the invention has been described by means of specific embodiments, numerous modifications and variations could be made thereto by those skilled in the art without departing from the scope and spirit of the invention set forth in the claims.

What is claimed is:

1. A navigation apparatus capable of making correction according to a map matching position, comprising:
    a satellite positioning module, for providing a plurality of position data;
    an electronic map database, for storing at least one map data;
    a map matching module, for matching the position data with the map data to generate a plurality of map matching positions corresponding to the position data respectively; and
    a correction module, for providing a turning point situated between the map matching positions, and calculating a turning angle at the turning point according to the map matching positions, wherein if the turning angle exceeds a threshold value, the correction module generates an offset by calculating the position data and the map matching positions recorded within a predetermined time according to an algorithm, and the offset is used for correcting position data;
    wherein the algorithm is $$\text{Delta}=((P(1)-p(1))+(P(2)-p(2))\ldots+(P(n)-p(n)))/n,$$

wherein Delta is the offset, P(1) ... P(n) are the position data, p(1) ... p(n) are the map matching positions, and n is the recorded number within the predetermined time.

2. The navigation apparatus of claim 1, wherein the navigation apparatus is a global positioning system (GPS) device, a mobile phone with a navigation function or a personal digital assistant with a navigation function.

3. The navigation apparatus of claim 1, wherein the satellite positioning module comprises a global positioning system (GPS) module.

4. The navigation apparatus of claim 1, wherein the position data comprises a plurality of latitude and longitude coordinates.

5. The navigation apparatus of claim 1, wherein the map matching position comprises latitude and longitude coordinate.

6. The navigation apparatus of claim 1, wherein the offset is provided for improving a computational speed of the map matching module.

7. The navigation apparatus of claim 1, wherein the offset is provided for improving a precision of the map matching positions.

8. A method of correcting position data according to map matching position, applied to a navigation apparatus which comprises a satellite positioning module, an electronic map database, a map matching module and correction module, and the method including the steps of:
    providing a plurality of position data by the satellite positioning module;
    using the map matching module to match the position data with the map data stored in the electronic map database for generating a plurality of map matching positions corresponding to the position data respectively;
    using the correction module to provide a turning point situated between the map matching positions, and calculating a turning angle at the turning point according to the map matching positions; generating an offset by calculating the position data and the map matching positions recorded within a predetermined time according to an algorithm, if the turning angle exceeds a threshold value; and
    correcting the position data behind the recorded position data by the offset;
    wherein the algorithm is $$\text{Delta}=((P(1)-p(1))+(P(2)-p(2))\ldots+(P(n)-p(n)))/n,$$

wherein Delta is the offset, P(1) ... P(n) are the position data, p(1) ... p(n) are the map matching positions, and n is the recorded number within the predetermined time.

9. The method of claim 8, wherein the navigation apparatus is a global positioning system (GPS) device, a mobile phone with a navigation function or a personal digital assistant with a navigation function.

10. The method of claim 8, wherein the satellite positioning module comprises a global positioning system (GPS) module.

11. The method of claim 8, wherein the position data comprise a plurality of latitude and longitude coordinates.

12. The method of claim 8, wherein the map matching positions comprise a plurality of latitude and longitude coordinates.

13. The method of claim 8, wherein the offset is provided for improving a computational speed of the map matching module.

14. The method of claim 8, wherein the offset is provided for improving a precision of the map matching positions.

* * * * *

UNITED STATES PATENT AND TRADEMARK OFFICE
CERTIFICATE OF CORRECTION

| | |
|---|---|
| PATENT NO. | : 8,082,094 B2 |
| APPLICATION NO. | : 12/214607 |
| DATED | : December 20, 2011 |
| INVENTOR(S) | : Jun-Tao Gao |

It is certified that error appears in the above-identified patent and that said Letters Patent is hereby corrected as shown below:

Title page, item (73) Under the Assignee information:
Please add second Assignee information: --Mitac International Corp., Kuei San Hsiang, Taoyuan, (TW)--

Signed and Sealed this
Twenty-sixth Day of June, 2012

David J. Kappos
*Director of the United States Patent and Trademark Office*